United States Patent
Moran et al.

(10) Patent No.: US 10,154,411 B2
(45) Date of Patent: Dec. 11, 2018

(54) PROXIMITY AUTHENTICATION PROTOCOL

(71) Applicant: ARM IP Limited, Cambridge (GB)

(72) Inventors: Brendan James Moran, Histon (GB); Milosch Meriac, Cambridge (GB); Geraint David Luff, Cambridge (GB)

(73) Assignee: ARM IP Limited, Cambridge (GB)

( * ) Notice: Subject to any disclaimer, the term of this patent is extended or adjusted under 35 U.S.C. 154(b) by 0 days.

(21) Appl. No.: 15/447,729

(22) Filed: Mar. 2, 2017

(65) Prior Publication Data
US 2017/0257760 A1  Sep. 7, 2017

(30) Foreign Application Priority Data
Mar. 2, 2016 (GB) .................................. 1603660.0

(51) Int. Cl.
| | |
|---|---|
| H04M 1/66 | (2006.01) |
| H04W 12/06 | (2009.01) |
| H04W 4/02 | (2018.01) |
| H04W 12/04 | (2009.01) |
| H04L 29/06 | (2006.01) |
| H04W 4/70 | (2018.01) |
| H04W 4/80 | (2018.01) |

(52) U.S. Cl.
CPC ........... *H04W 12/06* (2013.01); *H04L 63/107* (2013.01); *H04L 63/18* (2013.01); *H04W 4/023* (2013.01); *H04W 12/04* (2013.01); *H04W 4/70* (2018.02); *H04W 4/80* (2018.02)

(58) Field of Classification Search
USPC .................. 455/411, 434; 726/4, 7
See application file for complete search history.

(56) References Cited

U.S. PATENT DOCUMENTS

| | | | |
|---|---|---|---|
| 9,140,599 B1 | 9/2015 | Beckman | |
| 9,413,820 B2* | 8/2016 | Chang | ............... G06F 3/1454 |
| 2003/0235309 A1* | 12/2003 | Struik | ............... H04L 63/065 |
| | | | 380/278 |
| 2004/0015403 A1* | 1/2004 | Moskowitz | ........... G06Q 30/06 |
| | | | 705/26.61 |
| 2005/0243619 A1* | 11/2005 | Brown | ..................... G11C 7/24 |
| | | | 365/202 |

(Continued)

FOREIGN PATENT DOCUMENTS

| | | | |
|---|---|---|---|
| EP | 1051058 A2 * | 11/2000 | ............. H04R 17/00 |
| FR | 2983324 A | 5/2013 | |

OTHER PUBLICATIONS

UKIPO Examination and Search Report; GB 1603660.0; dated Aug. 17, 2016.

*Primary Examiner* — David Q Nguyen
(74) *Attorney, Agent, or Firm* — Pramudji Law Group PLLC; Ari Pramudji

(57) ABSTRACT

A machine implemented method of authenticating a communication channel between a first device and a second device by providing proof of proximity between both devices, the method comprising: generating, at the first device, an acoustic authentication signal to be received at the second device via a solid body acoustic coupling established between the first device and the second device thereby providing proof of proximity between both devices and so authenticating the communication channel between the first device and the second device.

15 Claims, 6 Drawing Sheets

(56) References Cited

U.S. PATENT DOCUMENTS

| | | |
|---|---|---|
| 2008/0268776 A1 | 10/2008 | Amendola |
| 2013/0078953 A1* | 3/2013 | Miller ............... H04M 1/72522 |
| | | 455/411 |
| 2013/0237155 A1 | 9/2013 | Kim |
| 2014/0180473 A1* | 6/2014 | Otzen ..................... G07F 17/40 |
| | | 700/232 |
| 2014/0373123 A1* | 12/2014 | Kang ...................... H04L 41/22 |
| | | 726/7 |
| 2015/0089593 A1 | 3/2015 | Herman et al. |
| 2015/0134481 A1* | 5/2015 | Glickfield .......... G06Q 30/0609 |
| | | 705/26.35 |
| 2015/0141005 A1 | 5/2015 | Suryavanshi et al. |

\* cited by examiner

PROXIMITY AUTHENTICATION PROTOCOL

CROSS-REFERENCE TO RELATED APPLICATIONS

This application claims priority to United Kingdom Patent Application No. GB 1603660.0 filed 2016 Mar. 2, the entire disclosure of which is herein incorporated by reference.

BACKGROUND OF THE INVENTION

Present techniques relate to a proximity authentication protocol used in the authentication of communication channels between devices. More particularly, the techniques relate to a method of authenticating a communication channel between a first device and a second device by providing proof of proximity between both devices.

More and more devices are being connected to each other and to cloud computing services, for example as part of the "Internet of Things". For example, relatively small devices such as temperature sensors, healthcare monitors and electronic door locks can be connected to the cloud so that they can be accessed and controlled using remote systems. For example, the door may be remotely opened from a remote platform, or data from a temperature sensor or healthcare monitor may be aggregated at a remote location and accessed from another device. Hence, there is an increasing amount of data being collected by cloud platforms and their providers.

As the Internet of Things becomes more widespread then internet security is becoming an increasingly important issue. Suppose a user wants to connect a smartphone to a device for the purposes of sharing data or performing a transaction then it is important that the user has confidence that the smartphone is connecting to the intended device, rather than a rogue device. Further, if the communication channel is intended to carry private data then the user must have confidence that the communication channel can be made secure.

SUMMARY OF THE INVENTION

According to a first technique, there is provided a machine implemented method of authenticating a communication channel between a first device and a second device by providing proof of proximity between both devices, the method comprising: generating, at the first device, an acoustic authentication signal to be received at the second device via a solid body acoustic coupling established between the first device and the second device thereby providing proof of proximity between both devices and so authenticating the communication channel between the first device and the second device.

DESCRIPTION OF THE FIGURES

Embodiments will now be described with reference to the accompanying figures of which.

DETAILED DESCRIPTION

Figure 1:
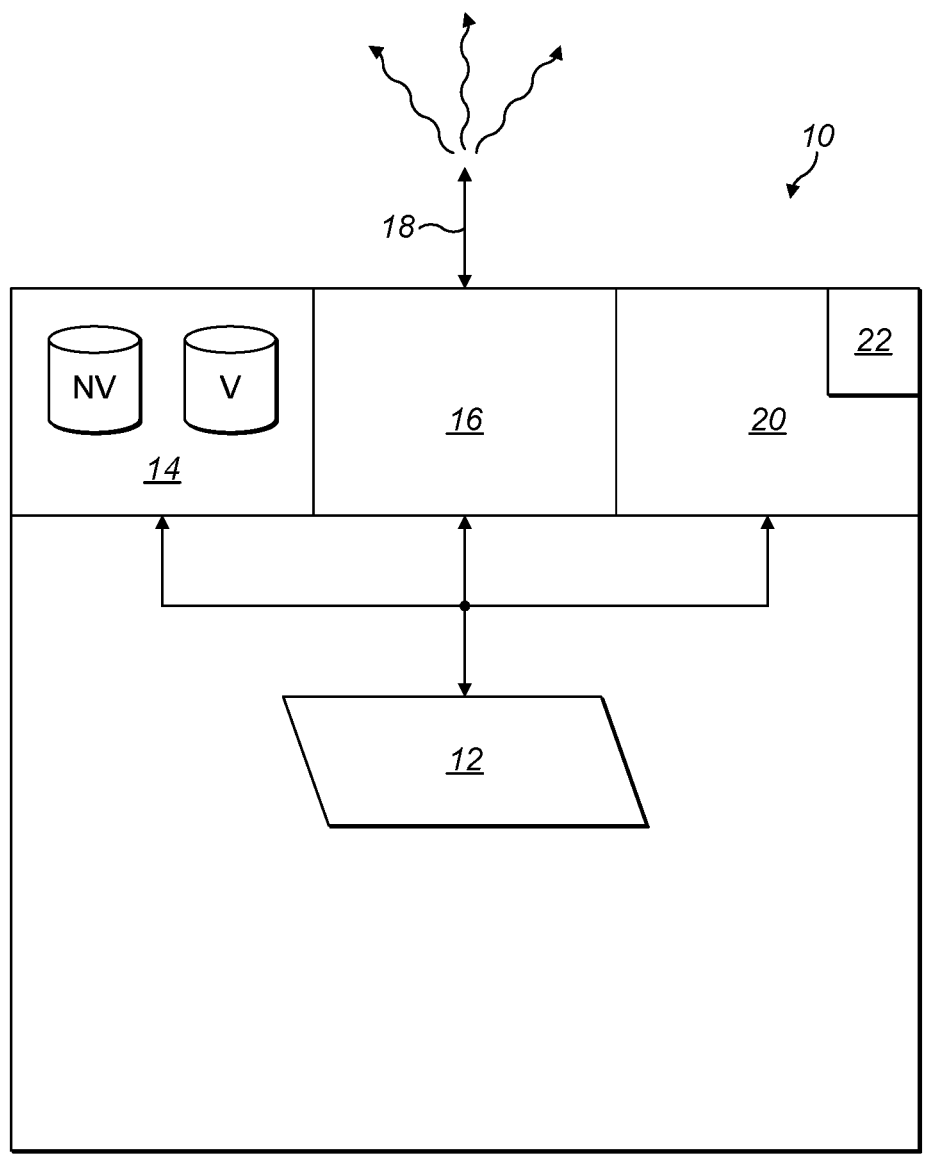
FIG. 1 is a schematic diagram of an IoT device.

Referring to FIG. 1, present techniques are described that schematically show an example of a data processing device such as an Internet of Things (IoT) device 10.

The circuitry illustrated in FIG. 1 includes processing circuitry 12 coupled to memory circuitry 14 e.g. volatile memory (V)/non-volatile memory (NV), such as flash and ROM. The memory circuitry 14 stores programs executed by the processing circuitry 12, as well as data such as UI resources, time-series data, credentials (e.g. cryptographic keys) and/or identifiers for a remote resource(s) (e.g. URL, IP address).

The IoT device 10 comprises communication circuitry 16 including, for example, near field communicating (NFC), Bluetooth Low Energy (BLE), WiFi, ZigBee or cellular circuitry (e.g. 3G/4G) for communicating with the remote resource(s)/device(s) e.g. over a wired or wireless communication link 18. For example, the IoT device 10 may connect to remote resource(s)/device(s) within a local mesh network over BLE, which in turn may be connected to the internet via an ISP router.

Figure 2:
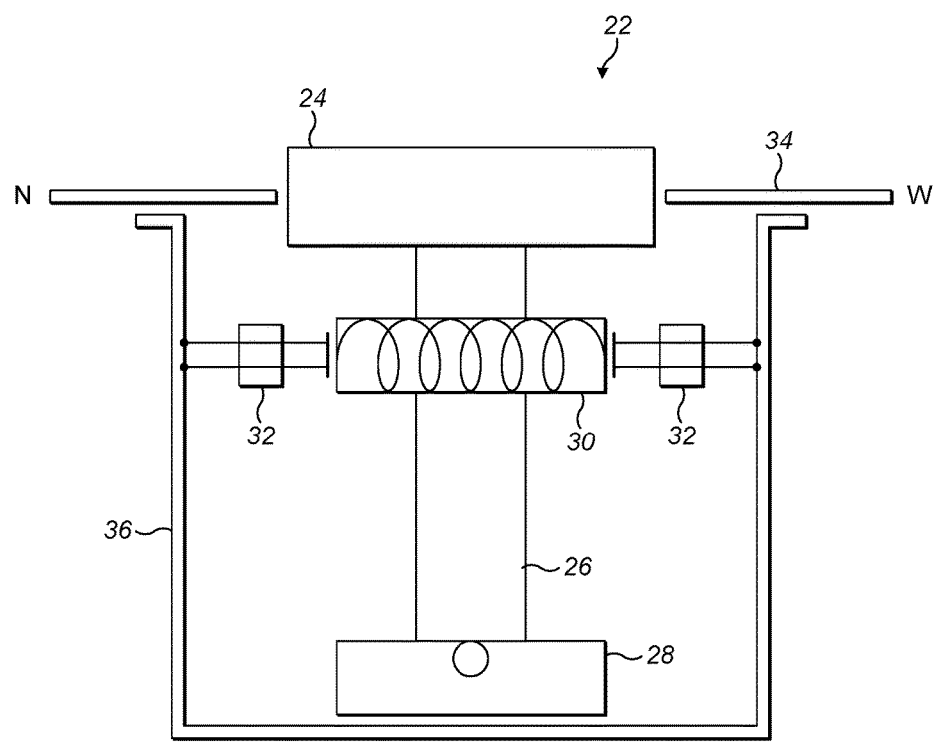
FIG. 2 is a schematic diagram of a sensor of an IoT device.

The IoT device 10 comprises input/output (I/O) circuitry 20 such as sensing circuitry to sense inputs and generate outputs via sensor 22 as shown in more detail in FIG. 2. The I/O circuitry 20 may also comprise a user interface e.g. buttons (not shown) to allow the user to interact with the IoT device 10.

The processing circuitry 12 controls various processing operations performed by the IoT device 10 such as encryption of data and/or transformation of URLS, communication, processing of applications stored in the memory circuitry 14.

The IoT device 10 may also comprise a display such as an organic light emitting diode (OLED) display or LED display (not shown) for communicating messages to the user.

Referring to FIG. 2, the IoT device 10 comprises the sensor 22 first introduced with reference to FIG. 1. The sensor 22 comprises a contact plate 24 connected to an actuator rod 26 having a far end connected to a pressure sensor or switch 28. A coil actuator 30 is provided about the actuator rod 26 and is supported on each side in part by vibration dampers 32. The sensor 22 sits within a housing 34 of the IoT device 10 and is kept firmly in place by mounting bracket 36.

Figure 3:
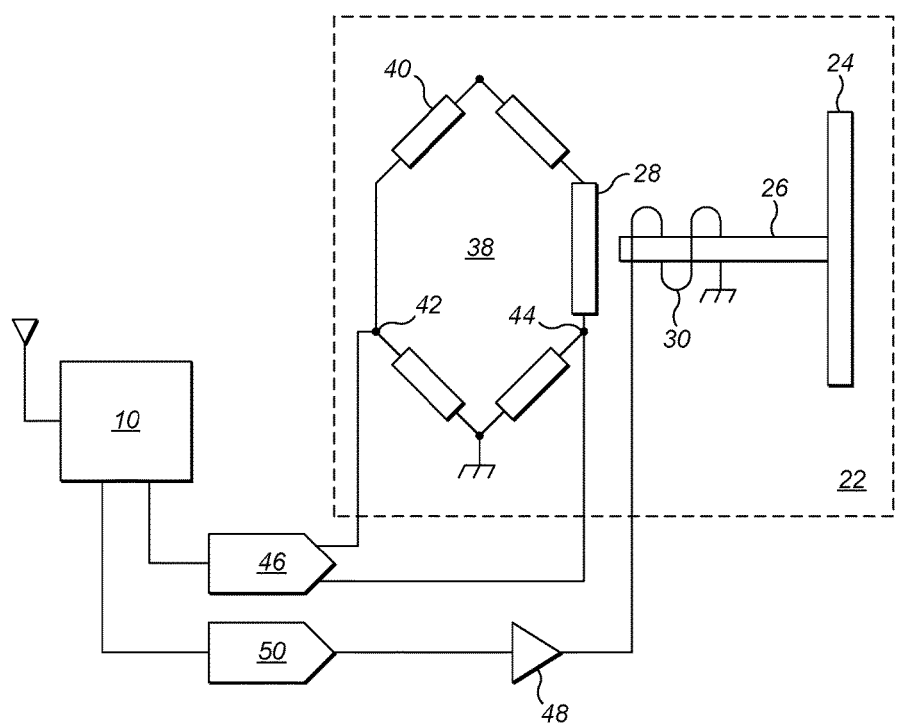
FIG. 3 is a schematic diagram of a sensor bridge circuit comprising part of a sensor of an IoT device.

As best seen in FIG. 3, the sensor 22 comprising the contact plate 24 is connected to the actuator rod 26 having a far end connected, in this embodiment, to a strain gauge 28 comprising a sensor bridge circuit 38. The sensor bridge circuit 38 comprises a number of resistive elements 40 whose resistances can range from less than 100Ω to several hundred kΩ depending on the sensor design and the physical environment. Only four resistive elements 40 are illustrated here for simplicity although the person skilled in the art would know that the choice of strain gauge 28 is wide and choice of set-up of the sensor bridge circuit 38 is dependent upon the application.

The strain gauge 28 is connected to the sensor bridge circuit 38 which comprises two output terminals 42 and 44 connected to an analogue to digital converter 46 by way of a positive and negative terminals of a differential amplifier (not shown in FIG. 3). The analogue to digital converter 46 comprises part of the circuitry 20 of the IoT device 10.

Also in FIG. 3, the coil actuator 30 provided about the actuator rod 26 is connected to an output terminal of an acoustic amplifier 48 comprising an acoustic modulator for generating an authentication acoustic wave. The acoustic amplifier 48 comprises an input terminal connected to a digital to analogue converter 50, which comprises part of the circuitry 20 of the IoT device 10.

There are several modulation schemes available, from the simplest (Amplitude Modulation), right up to more complex modulation schemes, such as Quadrature Amplitude Modulation (QAM) among several channels coupled together with Orthogonal Frequency Division Multiplexing (OFDM).

In operation, present techniques are particularly relevant in terms of provisioning consumer devices or interacting with public devices that require access to sensitive information, such as financial credentials.

For example, suppose a user wants to use an IoT-enabled vending machine. Entering an application program on a smartphone can enable a microphone on the smartphone. The user can press the smartphone against the sensor 22 on the vending machine. The pressure on the sensor 22 can activate the vending machine's acoustic amplifier 42 and acoustic modulator to generate an acoustic authentication signal to be received at the smartphone via a solid body acoustic coupling. The vending machine therefore uses the contact with the smartphone to transmit conductive acoustic data in the form of an authentication acoustic wave into the smartphone. The smartphone can record this data using the microphone and demodulate it in order to authenticate the vending machine. As will no doubt be appreciated by a person skilled in the art, because present techniques require physical contact, it is difficult to connect to the wrong device.

In embodiments, the smartphone may record the authentication data using its accelerometer. The authentication data may include, for example, a hash of the public key for the vending machine or a nonce.

Techniques may be particularly compatible with Google's™ Physical Web standard. Instead of selecting a particular vending machine by distance, which is inferred by Bluetooth signal strength—a method, which is particularly vulnerable to hijacking, a user could be confident that they are connecting to the machine in front of them due to the physical contact. Presently, the existing sorting criteria in the standard provides no guarantee that a device in front of the user is the device with the highest ranking in the list of detectable beacons. This list is sorted based on several factors, including bluetooth signal loss (the strength received divided by the strength reported by the transmitter) and ratings of previous users. This sorting facility is vulnerable to hijacking. To prevent hijacking, users of bluetooth beacons that transmit shortened URLs could be encouraged to use acoustic authentication by pressing their mobile against the bluetooth transmitter. This could either highlight the url with matching routing information, or automatically open that URL.

For example, according to present techniques a user could walk up to a bank of three vending machines, which are broadcasting shortened URLs. Because all three vending machines are in close proximity, it is difficult for the user to know which vending machine is which. The user then presses their mobile against one vending machine. This triggers the vending machine's acoustic modulator, which sends its MAC address. Upon receiving the MAC address, the user's mobile can determine which of the list items to load by matching the received MAC to the URL broadcast by that MAC. Then, the user can be confident that the vending machine they are interacting with is the one with which they are in physical contact.

A further example is the case of provisioning several devices, which are all in close proximity. Selecting one device out of a group of devices is typically done using signal strength, which can be imprecise. Using an acoustic modulator that requires physical conduction may improve the precision of connecting to the intended device.

In embodiments where the data rate of these techniques is low, authentication acoustic wave can be used for secure key exchange only. For example, the IoT device could transmit a cryptographic nonce and a hash of its public key and the nonce, which the smartphone could then use to establish a Bluetooth or WiFi-Direct connection.

While this invention may not preclude eavesdropping on the credentials transmitted by the IoT device, it makes Man in the Middle attacks very difficult. An attacker would need to place their own contact pad and elicit contact with that pad. A well-designed IoT device using an acoustic modulator would refuse to pair unless it had transmitted an ID via the contact pad recently (on the order of seconds). These countermeasures would require physical attacks to overcome.

In the case of accelerometer recording, the smartphone can identify which axis the acoustic waves are travelling in. Using an appropriate filter, the smartphone can ignore data being transmitted from unexpected axes. For example, the smartphone may ignore data unless it is coming from a corner of the screen. Additionally, the smartphone may explicitly ignore data coming from the front or back of the phone, which would eliminate the possibility of an attack based on contact through a pocket. Other possible countermeasures include sensing vibration using the acoustic modulator. Further possible countermeasures include selecting frequencies which transmit well over solid-to-solid acoustic boundaries, but less well over air-to-solid in order to require higher volume to target.

Since the acoustic data is physically conducted into the smartphone, high signal strength is possible with low power. This increases user confidence in the authenticity of the received data. If a rogue device tries to transmit a stronger signal through the air, it will be audible to the user. This makes it very difficult for a rogue device to hijack a connection without the user being aware. Virtually all smartphones have microphones and accelerometers, which makes this technology broadly applicable.

Embodiments will now be described further with reference to FIGS. 4, 5, 6 and 7.

Figure 4:
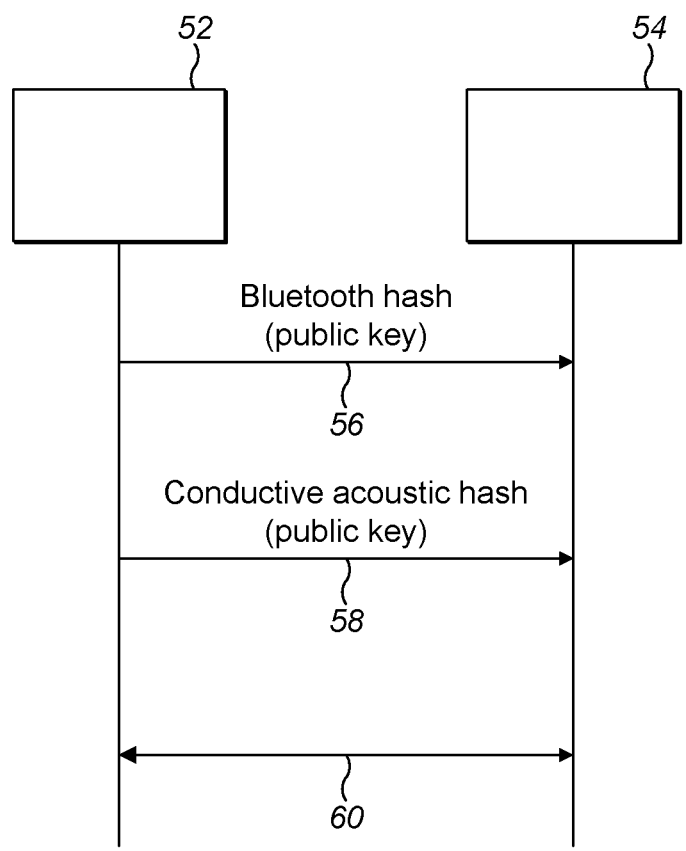
FIG. 4 is a schematic diagram of an IoT device and a portable device participating in a proximity authentication protocol.
Figure 5:
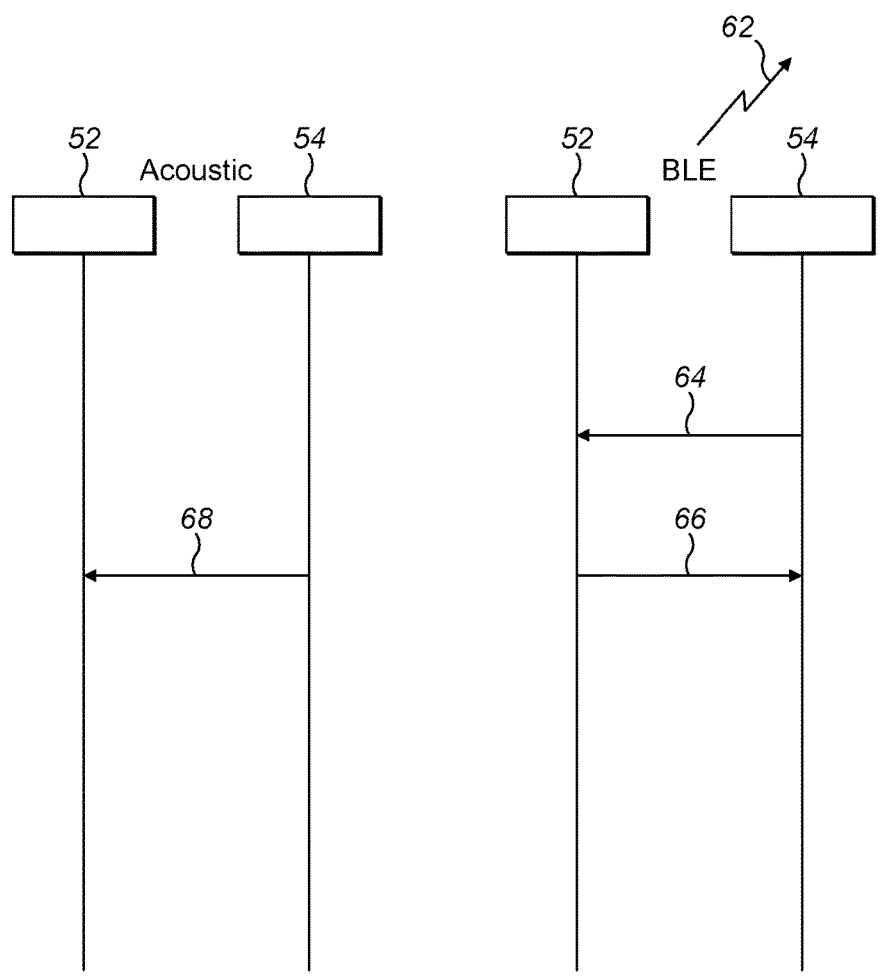
FIG. 5 is a schematic diagram of an IoT device and a portable device participating in a proximity authentication protocol with prior selection criteria.

Referring to FIG. 4, an IoT device 52 is broadcasting data which is received by a portable device 54. The communication link could be a Bluetooth communication link for example. The portable device 54 is carried by a user and is used to interact with other devices that are found within the user's environment. These may be embedded devices located within various objects such as locks within doors, locks within cars including ignition locks or access barriers to train stations. They may also be other devices that can be controlled such as light switches, power outlets, computing devices that require a login ID or thermostats in heating devices. They may be vending machines, sport lockers or bicycle stores.

The portable device 54 is configured to be able to communicate with these devices and to perform transactions with them such that they are controlled by the user in a straightforward manner using the portable device 54. Furthermore, where security is an issue the secure permissions may be stored within the portable device and transmitted automatically to the IoT device 52 such that the appropriate access is granted to the user without the need for the user to memorise any passwords.

In embodiments, the portable device 54 is a smartphone. Alternatively, the portable device 54 is an envoy device such as a smart watch and thus tends to display the current time. The time may also be used by a processor to determine the validity of certain permissions stored within a memory of the portable device 54. In this regard, some of the permissions may have a lifetime associated with them such that they expire at a certain time.

When the portable device 54 is placed in communication range with the IoT device 52 then a communication link is set up between the two devices and they exchange information with each other. Thus, in this case they will both transmit to the other one that they have a Bluetooth communication link and they can transmit the keys that are required to access each other via that link. A transaction request will then be transmitted from the portable device 54 to the IoT device 52. In response, the IoT device 52 can transmit at step 56 a hash of its public key to be received by the portable device 54.

According to present techniques, in order that the portable device 54 can authenticate that the physical identity of the IoT device 52 corresponds to the digital identity received at the portable device 54, it is necessary for the user to approach the IoT device 52 and initiate a proximity authentication protocol.

To do so, on entering an application program on the portable device 54 the user enables a microphone on the portable device 54. The user can press the portable device 54 against a sensor on the IoT device 52. The pressure on the sensor can activate the IoT device's acoustic modulator to generate an acoustic authentication signal at step 58 to be received at the portable device 54 via a solid body acoustic coupling authentication acoustic wave. The solid body acoustic coupling authentication acoustic wave comprises a hash of the public key corresponding to that previously transmitted and received at the portable device 54.

The IoT device 52 therefore uses the contact with the portable device 54 to transmit conductive acoustic data in the form of an authentication acoustic wave into the portable device 54. The portable device 54 can record this data using the microphone and demodulate it in order to authenticate the vending machine. As will no doubt be appreciated by a person skilled in the art, because present techniques require physical contact, it is difficult to connect to the wrong device.

Following from authentication 58 both the IoT device 52 and portable device 54 can continue to communicate on a suitable communication channel 60. Thus, it may decide to perform the transaction using the Bluetooth link. In other cases, it may determine that the Bluetooth communication circuitry is not suitable and it may use a near field communication link where possible and to complete the transaction using this or wifi connection.

In another embodiment, if a user already has requirements by which to select an IoT device 52, other than physical proximity, these requirements may be used to establish an initial connection, which is then authenticated. For example, a criterion may be an identifier for the IoT device 52 or a set of capabilities such as an ability to carry out an act, as communicated via Bluetooth advertising packet 62. The portable device 54 may establish a connection 64 based on this information (FIG. 5), and the two devices, 52 and 54 may continue to interact 66, exchanging only information that is safe to send to an untrusted device. In addition, information that characterises this connection is sent over the acoustic channel 68, for example the hash of a secret established using Diffie-Hellman key exchange, the public key used by the IoT device 52 during connection initialisation, or the MAC address of the IoT device 52. When this information has been received, the portable device 54 can now be confident that the IoT device 52 it has established a communication channel with is also the IoT device 52 with which it has physical contact.

Figure 6:
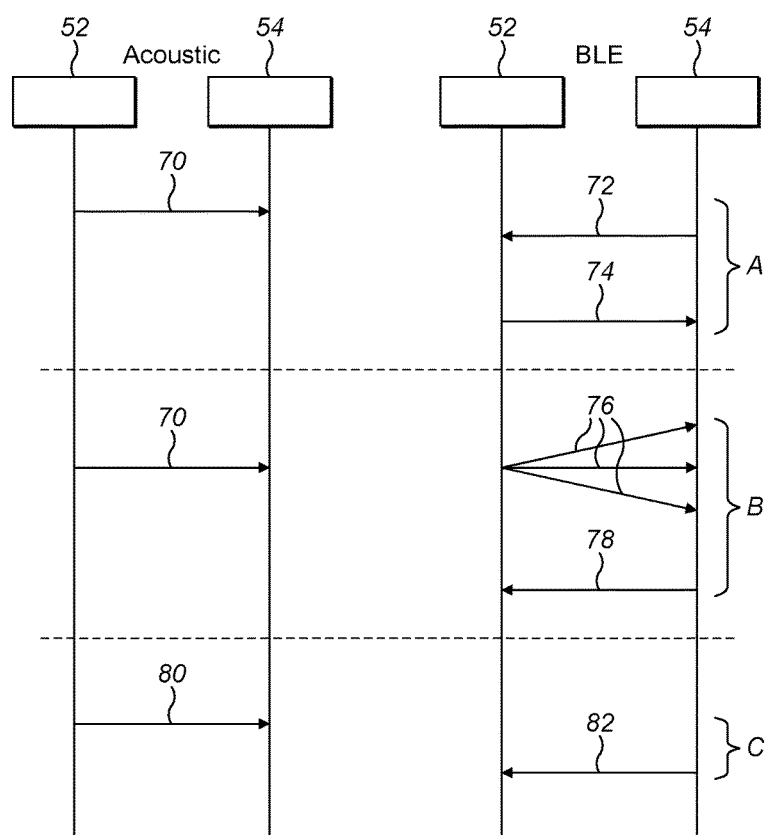
FIG. 6 is a schematic diagram of an IoT device and a portable device participating in a proximity authentication protocol without prior selection criteria.

If the user does not have any initial selection criteria, the portable device 54 cannot know which IoT device 52 to connect to as illustrated in FIG. 6. In this case, the IoT device 52 sends over the acoustic channel some information 70 that allows the user's portable device 54 to identify it to establish a faster connection. In a first embodiment (example A in FIG. 6) the IoT device 52 sends an identifier 70 over the acoustic channel, the user's portable device 54 broadcasts this identifier to signify to which IoT device 52 it wishes to connect, and the IoT device 52 replies 74.

In a second embodiment (example B in FIG. 6), the IoT device 52 sends an identifier 70 over the acoustic channel, and also broadcasts 76 this identifier in a Bluetooth advertising packet so that the user's portable device 54 can identify the correct IoT device 52 to connect to 78.

In a third embodiment (example C in FIG. 6), the IoT device 52 may send its MAC address 80 or other routing information, so that the user's portable device 54 may establish a connection directly 82 to the IoT device 52.

More generally, in the above situation where the user does not have initial selection criteria, authentication may be performed at the same time as determining which device to connect to. For example, a secret may be generated by the IoT device, and sent acoustically along with the identifier or routing information. Immediately after establishing a connection, either or both devices would present proof-of-knowledge of this secret, for example a hash of the secret combined with a nonce. This proof-of-knowledge may also include information characterising the connection, for example by presenting a hash of the secret combined with the MAC addresses of one or both devices, or an encryption key derived using Diffie-Hellman. This would prove to the other device that the device with which it has established this channel is also the device with which it has physical contact.

As will be appreciated by one skilled in the art, the present techniques may be embodied as a system, method or computer program product. Accordingly, the present techniques may take the form of an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

Present techniques may have particular utility as described in the following example. A surface can be provided as a table top or the like and attached under the table top is a body acoustics sensor and a detection circuit. Many options for sensors are known although a preferred sensor could be inductive or piezoelectric sensor to achieve a low power wakeup condition. In use the sensor is configured with a resonant frequency in the range of common phone vibration motors and a low noise amplifier amplifies the sensor signal into a range compatible with the analogue to digital converter input of a microcontroller.

Other features include:
To save power the low noise amplifier can be turned on/off with a low duty cycle.
Additional analogue filtering can happen before and/or after the low noise amplifier for further disambiguation and lower power.
The micro controller samples the input for detecting the presence of a signal and on detecting a signal it applies digital filtering for further disambiguation.
Case A) if the signal is still required valid, the data extraction and demodulation will be applied to the filtered data.
Case B) alternative to the data extraction process just the fingerprint of the data is sent created (for an instance FFT, per-frequency-phases, frequencies or wavelet and similar fingerprinting methods).
In case A or case B data is sent to a central hub that annotates the data with local information (Wifi names, MAC-addresses, GPS coordinates, visible mobile base stations etc.)
The properties of a user's portable device such as a smart phone may include (pseudo-)random or data-modulated buzzing or to either send the seed for the pseudo-random buzzing or the fingerprint gathered using the integrated accelerator plus localisation information (Wifi names, GPS coordinates, visible mobile base stations etc.)
In embodiments, the corresponding sequence can be broadcasted to allow matching:
transmit the corresponding seed for the sequence instead of the sequence itself;
Use information from candidate broadcasts on the second channel ("MAC addresses", NONCEs) to calculate candidate-sequences to scan for on the mechanic channel;
Include a time-dependent seed into the generation of the pseudorandom sequence on the mechanical channel; and
Optionally use secret key to calculate/hash the pseudorandom sequence.
A server may be used to correlate time of capture of incoming patterns/fingerprints or sent/decoded data to match Phones and Tables.

In particular, techniques may be applied to ordering of food/drinks in Bars/Restaurants without knowing location of the table or the need of signing up with an account. The authentication process seeks to defeat rogue orders not in proximity.

Accordingly in a first technique a machine implemented method of authenticating a communication channel between a first device and a second device by providing proof of proximity between both devices, is provided whereby the method comprises: generating, at the first device, an acoustic authentication signal to be received at the second device via a solid body acoustic coupling established between the first device and the second device thereby providing proof of proximity between both devices and so authenticating the communication channel between the first device and the second device.

The acoustic authentication signal can be generated in response to pressure applied against the first device by the second device.

The acoustic authentication signal can be a modulated signal and the modulated signal may carry a public key of the first device.

In embodiments, the acoustic authentication signal is audible. In further embodiments, the solid body acoustic coupling is provided through one or more layers, wherein optional one or more layers is a gel-like or flexible material.

Further, upon receiving the acoustic authentication signal at the second device, the second device may verify the acoustic authentication signal against a signal provided on the communication channel from the first device in order to authenticate the communication channel. Upon verification, the first and second device may communicate on the authenticated communication channel.

In a second technique a machine implemented method of authenticating a communication channel between a first device and a second device by providing proof of proximity between both devices is provided, the method comprising: receiving, at the second device, an acoustic authentication signal transmitted by the first device via a solid body acoustic coupling established between the first device and the second device thereby providing proof of proximity between both devices and so authenticating the communication channel between the first device and the second device.

In a third technique an apparatus comprising acoustic authentication signal generation circuitry is provided connected to a waveguide having an output capable of transmitting, via a solid body acoustic coupling, an acoustic authentication signal to a proximate device thereby providing proof of proximity between the apparatus and the device and so authenticating a communication channel between the apparatus and the device.

In a fourth technique a machine implemented method of identifying a first device by a second device to establish a communication channel by providing proof of proximity between both devices, comprises generating, at the first device, an acoustic authentication signal to be received at the second device via a solid body acoustic coupling established between the first device and the second device thereby providing proof of proximity between both devices and where the acoustic authentication signal is used by the second device to identify the first device to establish the communication channel.

In a fifth technique, there is provided a system of networked devices implementing a method of authentication by providing proof of proximity of a device, the method comprising: generating an acoustic authentication signal to be received at a device via a solid body acoustic coupling thereby providing proof of proximity of the device and so authenticating a communication channel between the device and the network.

The invention claimed is:

1. A machine implemented method of authenticating a communication channel between a first device and a second device by providing proof of proximity between both devices, the method comprising:
   transmitting, from the second device, a first device selection requirement;
   transmitting, from the first device to the second device, first device authentication information, over the communication channel when the first device meets the first device selection requirement;
   generating, at the first device, an acoustic authentication signal to be received at the second device via a solid body acoustic coupling established between the first device and the second device;
   transmitting the acoustic authentication signal to the second device via the solid body acoustic coupling thereby providing proof of proximity between both devices; and
   determining, at the second device, that the first device authentication information received over the communication channel corresponds to the acoustic authentication signal received via the solid body acoustic coupling, in order to authenticate the communication channel between the first device and the second device.

2. The method of claim 1, wherein the acoustic authentication signal is generated in response to pressure applied against the first device by the second device.

3. The method of claim 2, wherein the acoustic authentication signal is a modulated signal.

4. The method of claim 3, wherein the modulated signal carries a public key or a hash of the public key of the first device.

5. The method of claim 1, wherein the acoustic authentication signal is audible.

6. The method of claim 1, wherein the solid body acoustic coupling is provided through one or more layers, wherein optional one or more layers is a gel-like or flexible material.

7. The method of claim 1, wherein upon determining that the first device authentication information corresponds to the received acoustic authentication signal, the first and second device communicate on the authenticated communication channel.

8. The method of claim 1, wherein upon receiving the acoustic authentication signal at the second device, the second device identifies on which axis the acoustic authentication signal is travelling, and ignores acoustic authentication signals transmitted from unexpected axes.

9. The method of claim 1, wherein the acoustic authentication signal comprises a secret, and wherein the first device and/or the second device present proof-of-knowledge of the secret to authenticate the communication channel between the first device and the second device.

10. The method of claim 1, further comprising:
    sensing, at the first device, inputs from the second device;
    sending the inputs to a server; and
    annotating the inputs with localisation information.

11. The method of claim 1, further comprising:
    correlating, at a server, time of capture of the inputs to match the second device and the first device.

12. The method of claim 1, wherein the first device is provided at a table for ordering of food/drinks in Bars/Restaurants to the table, without knowing a location of the table.

13. The method of claim 1, wherein the first device is an IoT device.

14. The method of claim 1, wherein the solid body acoustic coupling is established between the first device and the second device when the second device is in physical contact with the first device.

15. A machine implemented method of authenticating a communication channel between a first device and a second device by providing proof of proximity between both devices, the method comprising:
    transmitting, from the second device, a first device selection requirement;
    receiving, at the second device, first device authentication information transmitted by the first device over the communication channel when the first device meets the first device selection requirement;
    receiving, at the second device, an acoustic authentication signal transmitted by the first device via a solid body acoustic coupling established between the first device and the second device thereby providing proof of proximity between both devices; and
    determining, at the second device, that the first device authentication information received over the communication channel corresponds to the acoustic authentication signal received via the solid body acoustic coupling, in order to authenticate the communication channel between the first device and the second device.

\* \* \* \* \*